Nov. 9, 1948.   H. N. OTT   2,453,257
ROTATABLE MICROSCOPE EYEPIECE MOUNTING
AND GUARD MEANS THEREFOR
Filed March 5, 1945   4 Sheets-Sheet 2

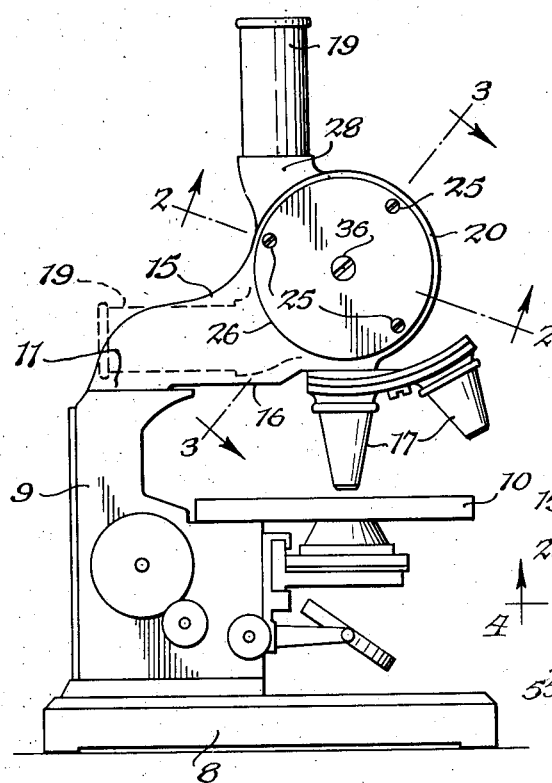

INVENTOR.
Harvey N. Ott,
BY
Parker, Trochnow & Farmer,
Attorneys.

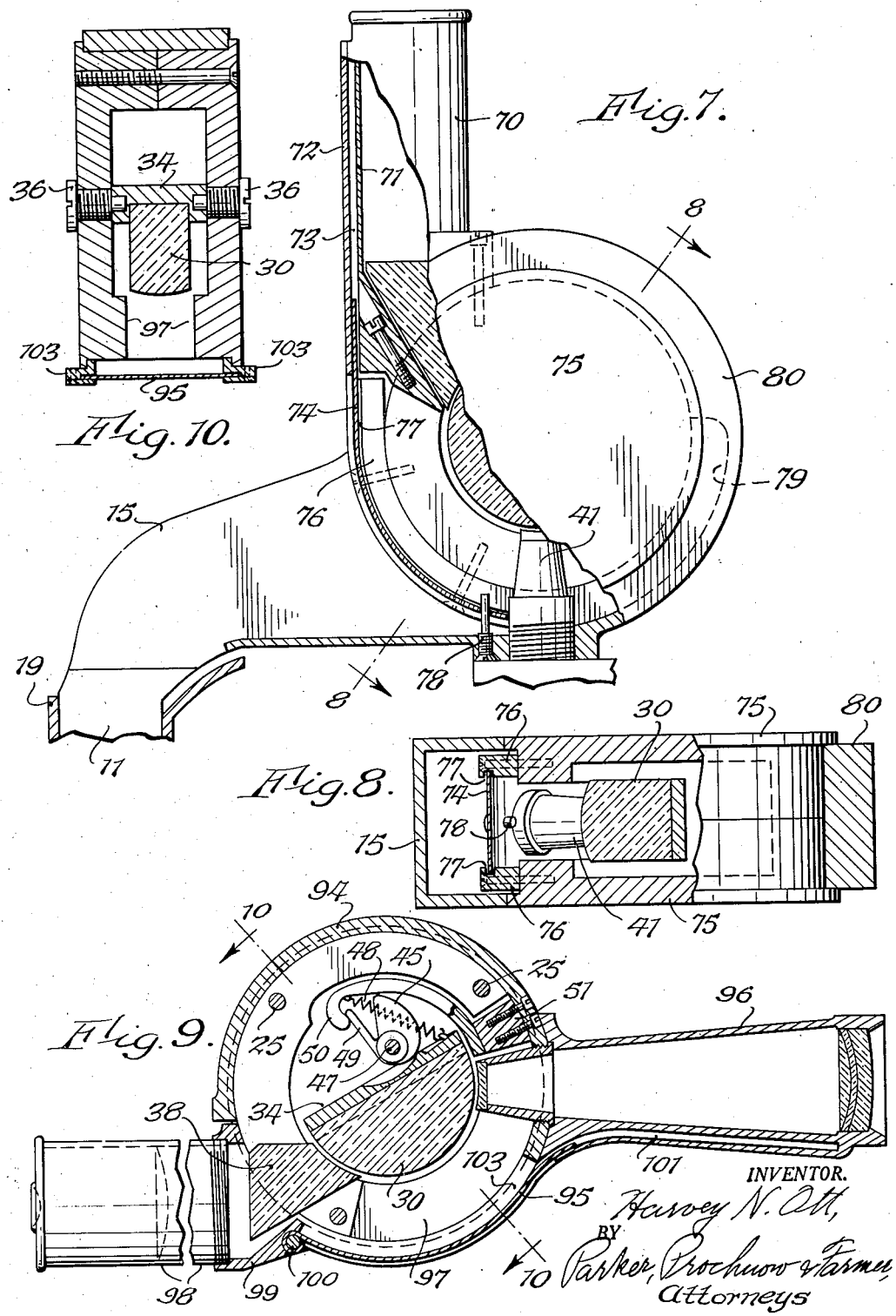

Patented Nov. 9, 1948

2,453,257

UNITED STATES PATENT OFFICE 2,453,257

ROTATABLE MICROSCOPE EYEPIECE MOUNTING AND GUARD MEANS THEREFOR

Harvey N. Ott, Buffalo, N. Y.

Application March 5, 1945, Serial No. 581,000

20 Claims. (Cl. 88—39)

1

This invention relates to improvements in optical instruments each having an eyepiece and an objective which are mounted to swing into different angular relations to each other.

One of the objects of this invention is to provide an eyepiece or objective mounting for an optical instrument which is constructed to swing through a large arc, to adapt the instrument to various conditions. Another object is to provide an eyepiece mounting for a microscope, which is constructed so as to be more readily accessible to the user in all positions thereof. A further object is to provide an optical instrument of improved construction by means of which the eyepiece and objective may be swung relatively to each other through an angle of approximately 90 degrees. A further object is to provide a mounting of this type which may be swung from one position to another without requiring any adjustments by the operator other than the shifting of the eyepiece or objective itself into the desired position. A further object is to provide a guard of improved construction for protecting the various adjustable parts of the instrument mounting from dust or other foreign matter. Other objects and advantages of this invention will appear from the following description and claims.

In the accompanying drawings:

Fig. 1 is a side elevation of a microscope embodying this invention.

Figs. 2 and 3 are sections thereof, on an enlarged scale, respectively on lines 2—2 and 3—3 of Fig. 1.

Fig. 7 is an elevation, partly in section of a microscope having a guard or shield of modified construction.

Fig. 8 is a sectional view thereof, on line 8—8, Fig. 7.

Fig 9 is a longitudinal horizontal central sectional view of a telescope having a guard or shield of modified construction.

Fig. 10 is a section thereof, on line 10—10, Fig. 9.

Figure 4:
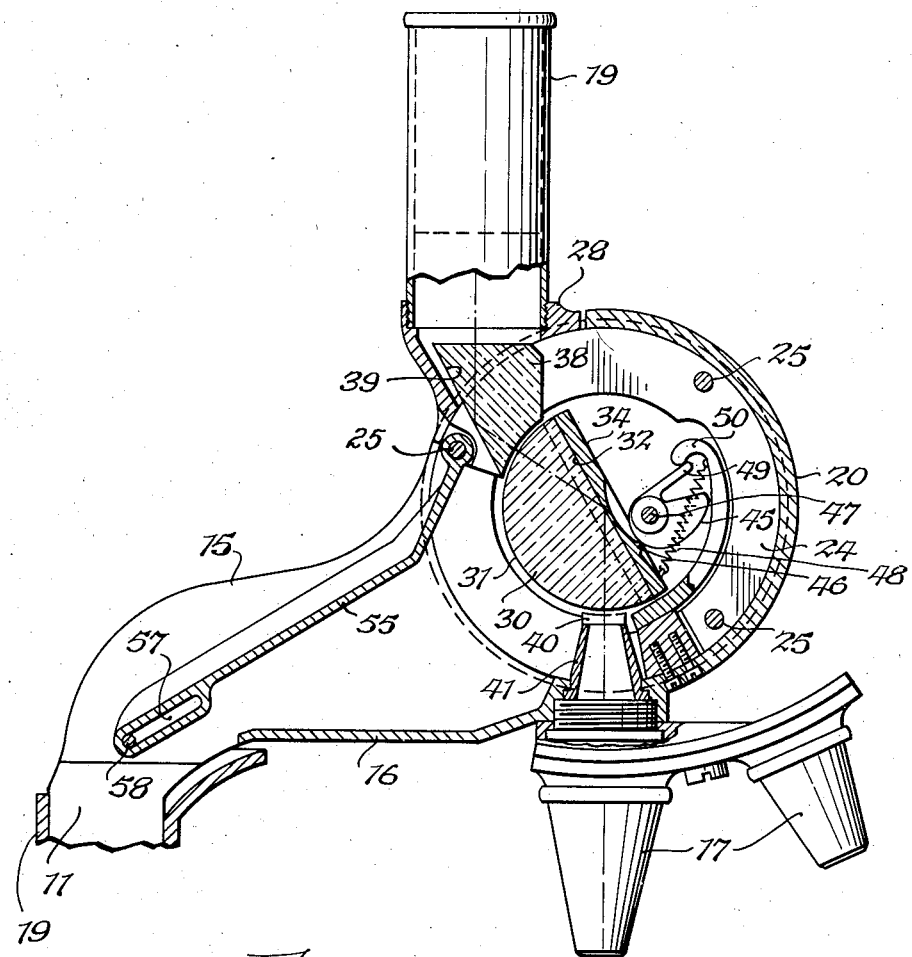
Fig. 4 is a fragmentary central sectional elevation of the microscope, showing the eyepiece mounting with the eyepiece tube in upright position, the section being taken in part on line 4—4, Fig. 2.

The improvements embodying this invention as shown in the particular construction illustrated

2 in Figs. 1 to 5 are applied to a microscope having an eyepiece which is adjustable relatively to the objective. This microscope includes a base 8 to which a standard 9 is rigidly secured and which supports a stage 10. The microscope also includes an arm 11 which is mounted for vertical adjustment on the standard 9 in any usual or suitable manner.

The arm 11 of the instrument includes a part which extends over the stage 10 and which is preferably of U-shaped cross section, being provided with sides 15 preferably integrally connected at their lower ends by a transverse portion or web 16, and the arm near its end may support any suitable or desired objective or objectives 17. The arm is considerably enlarged at its outer end above the objective 17 and is provided with an aperture, the center of which is formed on an axis which intersects the optical axis of the objective. This aperture extends through both of the sides 15 of the arm.

19 represents the eyepiece tube of the instrument which is mounted to swing through approximately a right angle relatively to the optical axis of the objective, the eyepiece tube being shown in its upright position in full lines in Fig. 1 and in its horizontal position shown in broken lines, and the eyepiece tube may be moved into any position intermediate of the two extreme positions shown in Fig. 1. The eyepiece tube may be mounted on the arm 11 of the instrument in any suitable manner so as to permit light from the objective to be reflected into the eyepiece tube, and in the particular construction shown for this purpose, the eyepiece tube is secured on a drum which is rotatably mounted in the aperture formed in the end of the arm 11. The transverse web 16 of the U-shaped portion of the arm extends partly around the apertured portion of the arm, thus forming a partly circular web or sleeve 20 which is preferably formed integral with the sides of the arm and which forms a part of a cylindrical bearing for the drum, the remainder of the cylindrical bearing being formed by the edges of the aperture in the sides of the arm 11. The rotatable hollow drum is preferably formed of a pair of plates or disks 21 and 22 having inwardly extending peripheral flanges 23 and 24 respectively which contact at their inner surfaces. In assembling the microscope, these two plates and their flanges are inserted from opposite sides of the arm into the circular apertures formed in the upstanding sides thereof, and the two parts of the drum may then be secured together in any suitable manner, for example, by means of a plurality of screws 25. The outer surfaces of the drum are formed to bear on the inner surface of the sleeve 20 and of the holes in the sides of the arm so that the drum may revolve on the arm on an axis which passes through a line coinciding with the optical axis of the objective. In order to prevent endwise movement of this drum, the two plates 21 and 22 forming the drum may be provided with radially outwardly extending flanges 26 engaging the opposite sides of the U-shaped portion of the arm 11. Consequently, by adjusting the screws 25 the friction of the flanges 26 on the ends of the web or sleeve 20 may be varied. Any other means for mounting the hollow drum for accurate rotation on the arm 11 of the instrument may be provided.

The eyepiece tube 19 may be mounted on the drum in any suitable or desired manner, and in the construction illustrated, the eyepiece tube is secured on a hollow bracket or support 28 which may be suitably mounted, for example, by screws (not shown) on the outer surface of the drum, the eyepiece tube 19 having a screw-threaded connection with the bracket 28. The eyepiece tube, as shown, is preferably arranged tangentially on the drum, so that the eyepiece will be offset with reference to the objective when in its upper position as shown in Figs. 1 and 4, thus bringing the eyepiece nearer to the user of the instrument.

Light is transmitted from the objective 17 to the eyepiece tube through the medium of a reflector arranged in the hollow drum, light from the objective entering the drum through a suitable opening 29, Fig. 3, in the flanges 23 and 24 of the plates forming the hollow drum. This reflector may be of any suitable or desired type, and in the construction illustrated by way of example, the reflector is in the form of a transparent body or lens reflector 30 having an outer surface 31 of hemispherical or semi-cylindrical curvature, the sides of the reflector being plain or of other suitable form and the reflecting surface 32 of the reflector lens may be silvered and is arranged in a plane passing through the center or axis of curvature of the outer surface 31. In order to avoid chromatic abberation, the reflector should be such as to avoid refraction of the light passing to and from the reflecting surface. If the lens reflector has a hemispherical surface, its center of curvature should lie in the axis of rotation of the drum and in the axial ray passing from the objective to the eyepiece. In the microscope illustrated, for example, this axis of rotation lies in the optical axis of the objective. If the lens reflector has a semi-cylindrical surface, the axis of generation of this surface should coincide with the axis of rotation of the drum and intersect the optical axis of the objective or an axial ray passing from the objective to the eyepiece.

Any suitable means may be provided for rotatably mounting the reflector within the drum, and in the construction illustrated, the reflector is mounted on a back or supporting plate or frame 34 having bearings formed in the opposite sides thereof, the bearings being formed to receive pivot pins or pintles 35 which, in the construction illustrated, are formed in the ends of screws 36 arranged in threaded holes in the central or axial portion of the drum. The pivotal axis on which the reflector swings lies in the reflecting surface of the reflector, and also coincides with the axis of rotation of the drum. The reflector 30 is swung about its pivotal mounting by suitable means, such for example, as those hereinafter to be described, so that light from the objective 17 will be reflected by the reflector 30 to another reflector which is mounted in fixed relation to the eyepiece tube 19 in such a manner as to reflect the light from the first reflector through the eyepiece tube. This other reflector, in the construction shown, is in the form of a prism 38 having a reflecting surface 39 and this prism may be mounted in any suitable manner with reference to the eyepiece tube, for example, by clamping the same in a recess in the flanges of the two plates which form the rotary drum. This reflector erects the image which is inverted by the first reflector. This prism 38 may be replaced by any other suitable type of reflector.

In order that the eyepiece may be swung through a large angle relatively to the objective, for example, an angle of approximately 90 degrees, I arrange the reflecting surface 39 at an angle of materially less than 45 degrees to the optical axis of the eyepiece, for example, at about 30 degrees, as shown in the drawings. The axial ray from the objective is, consequently, reflected from the reflecting surface 32 in such manner as to strike the reflecting surface 39 always at the same angle.

Preferably light passing from the objective to the partly spherical or cylindrical lens reflector 30 passes through a concave lens 40 which may be mounted above the objective and the concave face of which is arranged in close proximity to the lens reflector 30 and has a curvature concentric with the curved face 31 of the lens reflector. This lens may be mounted in operative relation to the objective and to the lens reflector in any suitable manner, for example, by securing the same on a hollow truncated cone 41, the base of which may be held in place in a threaded hole in the main arm 11 of the microscope above the objective. The prism 38 is also provided with a surface which has a curvature concentric with the curvature of the face 31 of the lens reflector, and which is arranged as closely as possible to the lens reflector without contacting therewith or rubbing thereon. These concave surfaces of the prism 38 and the lens 40 compensate for refraction of light passing into and out of the lens reflector.

In order that light from the objective may be at all times reflected to the reflector or prism 38 and into the eyepiece tube, it is necessary that the reflector 30 be moved through half of the angle through which the eyepiece tube and the drum are moved, and any suitable or desired means may be provided for producing this movement of the reflector 30. In the construction shown for this purpose, I have provided a cam 45 which controls the swinging of the reflector or lens 30, the cam being pivotally mounted on the drum formed by the two plates 21 and 22 and engaging with a projection or knob 46 formed on the rear face of the back or supporting plate 34 of the reflector 30. A spring 48 urges the reflector 30 into contact with the cam 45. This cam has outwardly extending hinge pins or pintles 47 engaging in holes formed in the plates 21 and 22 of the drum. The cam also engages a fixed part of the optical instrument to provide the desired movement of the cam about its hinge pintles. In the particular construction shown by way of example, the cam 45 has an arm or extension 49 which engages the end of a fixed arm or neck 50, secured to a block 51 which in turn is rigidly secured to the main arm 11, for example, to the sleeve 20 thereof. It will be seen from inspection of Figs. 4 and 5 that the spring not only holds the reflector 30 against the cam 45, but also holds the arm 49 of the cam against the projecting end of the stationary arm 50, and consequently, by correctly shaping this cam, the mechanism described will produce a movement of the reflector 30 which is equal to half of that of the eyepiece tube 19 and the drum formed by the two plates 21 and 22. Consequently, during all positions of the eyepiece tube, light from the objective will be transmitted to the eyepiece tube. It will also be noted that by means of the construction described, in which the first reflector 30 is arranged in an extension of the optical axis of the objective, light will be reflected axially into the eyepiece tube throughout all positions thereof while the eyepiece tube is swung through an axis of approximately 90 degrees.

Figure 5:
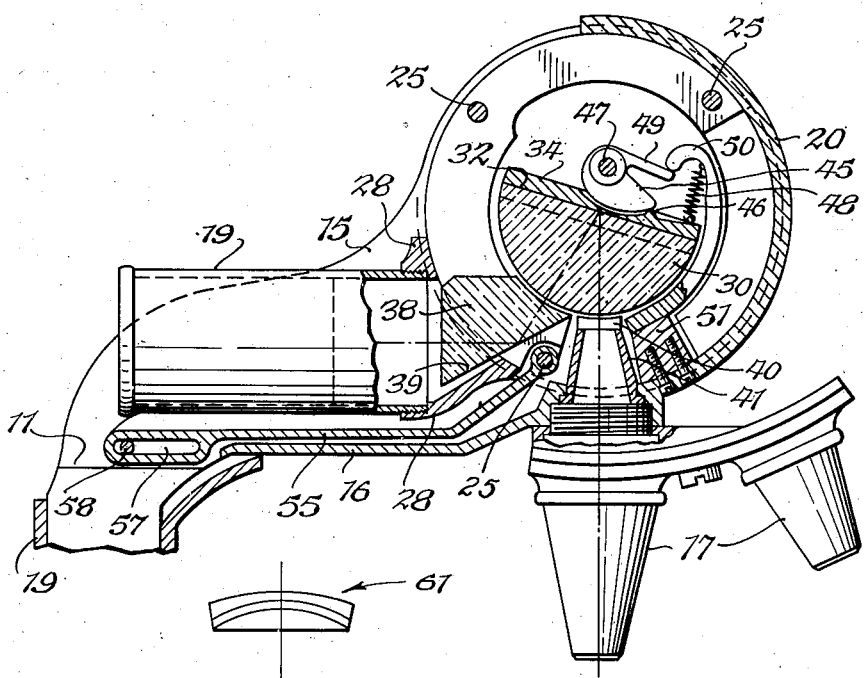
Fig. 5 is a similar view showing the parts of the mounting when the eyepiece tube is in horizontal position.

Because of the large angle through which the eyepiece and the drum attached thereto swing, a large opening must be provided in the flanges of the two plates forming the drum, to clear the hollow cone 41 and the block 51, and this opening also permits free passage of light from the objective to the eyepiece in all positions of the eyepiece. Means must, consequently, be provided to exclude light, dust and other foreign material from the reflectors and the mechanism producing the desired movement of the same. In the construction shown for this purpose, the sleeve 20 and the closed peripheral portion of the drum formed by the plates 21 and 22 act to partly protect the mechanism and reflectors. In order to close this opening in the peripheral portion of the drum, I provide a movable guard 55 which is pivotally mounted at one end thereof on one of the screws or bolts 25 extending into holes formed in the plates 21 and 22 of the drum, and acting in conjunction with the other screws 25 to hold the two plates 21 and 22 together to form the hollow drum. This guard fits snugly into the opening in the flanges of the plates 21 and 22 and also between the two sides 15 of the arm of the microscope. The upper surface of this guard may be made concave to provide more extended bearing surfaces between the guard and the upright sides of the main arm. The lower end of this guard is provided with a slot 57 through which a pin 58 extends, the ends of the pin extending into holes in the sides 15 of the arm. The pin 58 and slot 57 are so arranged relatively to each other that the guard 55 may at all times form a tight joint between the sides 15 and the lower web of the arm 11, to exclude light and foreign matter from the mechanism and reflectors of the microscope. As the eyepiece tube is swung downwardly from its upper position shown in Fig. 4, the guard proceeds ahead of it until its flat lower surface substantially touches the top surface of the bottom web 16 of the arm, as shown in Fig. 5.

Figure 6:
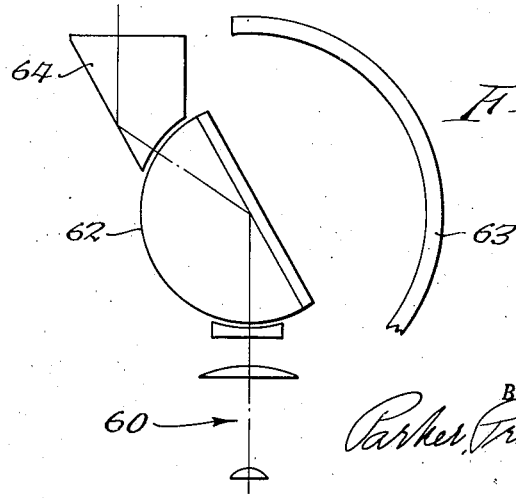
Fig. 6 is a diagrammatic view showing my improvements as applied to a telescope.

In the application of my improvements to a telescope, which is diagrammatically shown in Fig. 6, the arrangement is reversed from that shown in Figs. 1 to 5, in that the optical axis of the eyepiece 60 is fixed or stationary, while the objective 61 may swing through an angle of approximately 90 degrees relatively to the optical axis of the eyepiece. The objective may be mounted on structure similar to that on which the eyepiece is mounted in Figs. 1 to 5, only a part of the peripheral bearing for the drum which carries the lens reflector 62 being shown at 63. The prism 64 moves with the objective in fixed relation thereto and its reflecting surface is arranged at an angle less than 45 degrees to the optical axis of the objective. The reflector 62 moves through an angle equal to half of the angle through which the objective 61 and prism 64 move, and this movement of the reflector may be controlled by any suitable means, such for example as those shown in Figs. 4 and 5. The reflector 62 must turn about a pivot which lies on the axial ray passing from the objective to the eyepiece, which, in the construction illustrated, coincides with the optical axis of the eyepiece. The operation of this telescope will be obvious, being similar to that described in connection with the microscope.

In the modified construction shown in Figs. 7 and 8, the microscope is similar in construction to that shown in the preceding figures, but is provided with a guard or shield of different construction to exclude light, dust and other foreign material from entering into the drum to which the eyepiece 70 is secured. In this construction, a thin strip of flexible metal or other material is employed to form the guard. The eyepiece in this construction is provided at that side thereof which is farthest removed from the axis of the drum with a narrow rectangular cavity or recess into and out of which the flexible strip may pass, this cavity being formed by a part 71 which may be integral with the eyepiece tube, and a cover member 72 which may be suitably secured thereto, these parts forming between them an elongated cavity or slot 73 which is closed at the outer part of the eyepiece and open at its other end into which the flexible guard strip 74 may enter.

In order to hold the guard strip in correct relation to the drum and to form a light-proof joint between the strip and the drum, the drum 75 of the microscope is provided at opposite sides thereof with guide members 76 which extend somewhat more than 90 degrees around the peripheral portion of the drum adjacent to the eyepiece and these guide members are provided with slots 77 into which the opposite edges of the flexible strip 74 may enter. The lower end of the flexible strip may be held in place with reference to the arm of the microscope in any suitable manner, for example, by means of a screw 78 secured to the arm and having a stem formed integral therewith and extending through a hole in the flexible member 74. The lower end of the flexible member terminates at the objective and as the eyepiece tube 70 is swung downwardly from its upper position shown in Fig. 7, the flexible member 74, being held at its lower end by the screw 78, will slide into the channel 73 in the eyepiece tube. During this swinging, the guide members 76 which are attached to the drum 75 will turn with the drum and enter into suitable spaces or openings 79 provided in the circular frame part 80 of the microscope arm within which the drum is rotatably mounted. It will thus be seen that the flexible strip 74 will exclude light, dust and other foreign matter from the interior of the drum in all positions of the eyepiece tube.

In Fig. 9, a similar flexible guard strip 95 is provided. In this construction, the objective tube 96 is secured to the outer bearing part 94 for the drum 97 and swings with this part about the drum while the eyepiece 98 and drum remain in fixed position. One end of the flexible guard 95 is secured to the hollow bracket 99 to which the eyepiece tube 98 is secured, for example, by means of a pin 100 which is secured to the bracket 99 and extends into a loop or bead formed on the end of the flexible strip 95 intermediate of the opposite edges of the strip. The objective tube 96 is provided with a cavity or slot 101 into which the free end of the flexible strip 95 may enter when the objective tube is swung downwardly in Fig. 9. The outer bearing part 94 is also provided with curved guide members 103 at opposite sides thereof, which have channels or grooves formed therein to receive the edge portions of the flexible strip 95, as clearly shown in Fig. 10. As shown in Fig. 9, the objective tube is mounted to swing in a horizontal direction, but it will be obvious that the microscope assembly may be turned as a unit through 90 degrees, if it is desired to swing the objective in a vertical plane through approximately 90 degrees.

In the various constructions illustrated, I have shown instruments in which the axial ray passes from the objective in a straight line to the cam-actuated reflector. It will be understood, however, that it may be desirable to reflect the axial ray one or more times before it reaches the objective, as for example in the case of periscopes. In other cases, it may be desirable to have the cam-actuated reflector spaced a considerable distance from the objective, in which case, light from the objective may be reflected one or more times before it passes to the cam-actuated reflector. It is also possible to employ my improvements with binocular eyepieces by reflecting the light in the usual manner to both eyepieces of a binocular instrument.

The constructions described have the advantage that the eyepiece and objective may swing relatively to each other through a much larger arc than in other prior constructions, thus making the optical instrument more readily adaptable to various conditions and to various users. The microscope construction also provides for an offsetting of the eyepiece toward the user of the microscope, as clearly shown in Figs. 1 and 4, so that even when the eyepiece tube is in its upper position, it is considerably nearer to the operator than the optical axis of the objective.

I claim as my invention:

1. An optical instrument having an arm, the upper end portion of said arm having a circular aperture therein and having a concave portion open on its upper side and connecting said apertured end with an upright portion, a pair of refracting elements, one constituting an eyepiece and the other constituting an objective, one of said elements being mounted on said arm with its optical axis intersecting the axis of said circular aperture, a drum mounted in said circular aperture, the other of said elements being secured to said drum, said drum and said other element being formed to swing through an arc of approximately 90 degrees, a reflector pivotally mounted in said hollow drum with its pivotal axis intersecting the optical axis of said element mounted on said arm, means for controlling the swinging of said reflector to reflect light from one of said elements to the other, said drum having a peripheral opening therein through which light may pass from one of said elements to the other, and a guard pivotally connected with said drum and arranged in said concave portion of said arm for excluding light and foreign material from the interior of said drum.

2. An optical instrument in accordance with claim 1, characterized in that said guard is in the form of a plate having a portion thereof extending between the sides of the drum and another portion extending between the sides of the concave portion of said arm for excluding light and foreign matter from the interior of said drum.

3. A microscope in accordance with claim 1, characterized in that said guard is in the form of a plate having a portion thereof extending between the sides of the drum and pivoted to said drum, and having another portion extending between the sides of the concave portion of said arm, and a slidable connection between said other portion of said guard and said arm for holding said guard in place between said sides, for excluding light and foreign matter from the interior of said drum.

4. An optical instrument having a pair of refracting elements, one of which constitutes an objective and the other of which constitutes an eyepiece, tubular members in which said elements are mounted, a pivotal joint including a hollow drum part and a part in which said drum is rotatably mounted to enable said drum and said part to swing relatively to each other through an angle of approximately 90 degrees, the tubular member of one element being secured to said drum part and the tubular member of the other element being mounted on said part in which said drum is mounted, means in said drum part for reflecting light from one of said elements to the other, said drum part having an opening in the peripheral portion thereof through which light passes from one element to the other, and a flexible strip arranged to cover said opening in said drum part and secured to one part of said joint and having a slidable connection with the tubular member secured to the other part of said joint.

5. An optical instrument according to claim 4, in which the tubular member secured to the other joint part has a cavity in which said flexible strip slides when one joint part is swung relatively to the other joint part.

6. In an optical instrument having two refracting elements constituting an eyepiece and an objective, that improvement which includes a hinge connection between said two elements including a cylindrical hollow drum having side walls and a substantially cylindrical outer wall and having one of said refracting elements mounted in fixed relation thereto, a bearing member surrounding said cylindrical surface of said drum and within which said drum bears, the other refracting element being mounted in fixed relation to said bearing member, said cylindrical surface of said drum being provided with an opening therein for the passage of light from one of said elements to the other, and reflecting means within said drum for reflecting light from one of said elements to another, said bearing member and said drum shielding said reflecting means against extraneous light and dust.

7. An optical instrument having two refracting elements constituting an eyepiece and an objective, a hollow partly cylindrical bearing member having its inner surface finished to form a cylindrical bearing and having one of said elements mounted in fixed relation thereto, the axis of said cylindrical bearing lying in the path of the axial ray of light from the objective, a hollow drum having a portion thereof arranged within said partly cylindrical member and having the peripheral portion thereof bearing in said finished inner surface thereof to revolve therein to form a hollow axle, the other of said refracting elements being mounted on said drum in substantially tangential fixed relation thereto, said cylindrical bearing member having a segmental opening in which a part of said other element moves when said drum is rotated within said bearing member, a reflector arranged within said hollow drum, a supporting frame for said reflector having pintles pivoted on said drum substantially concentric with the axis of rotation of said drum and rotatable independently of said drum about said pintles, said frame supporting said reflector with the axis of said pintles lying substantially in the plane of the reflecting surface of said reflector, a second reflector secured to said drum in fixed angular relation to said other refracting element, a cam movably mounted on said drum, and a part mounted in fixed relation to said hollow partly cylindrical member and cooperating with said cam for moving said cam when said drum is rotated to turn said frame through approximately half of the angle of movement of said drum relatively to said fixed member, said reflectors being arranged to reflect light from one refracting element to the other.

8. An optical instrument having two refracting elements constituting an objective and an eyepiece, a hollow partly cylindrical supporting member having a portion thereof finished to form a bearing, one of said refracting elements being secured in fixed relation to said cylindrical member with the axial ray of the light passing from one refracting member to the other passing substantially radially with reference to said partly cylindrical member, a hollow cylindrical drum having the peripheral portion thereof in bearing contact with said finished bearing surface of said supporting member to rotate therein about the axis of said cylindrical supporting member, the other of said refracting elements being secured to said drum in substantially tangential relation thereto, said cylindrical supporting member having a segmental opening in which a part of said other refracting element moves when said drum is rotated within said bearing member, said drum being formed of two disks, at least one of which extends into said cylindrical supporting member, means for securing said disks to each other, a reflector within said hollow drum, a frame supporting said reflector and pivotally mounted on said disks to swing independently of said drum about a pivotal axis coinciding substantially with the axis of rotation of said drum, said reflector being arranged with said axes substantially in the plane of its reflecting surface, another reflector mounted in fixed relation to said drum and to said other refracting element and arranged in acute angular relation to the optical axis of said other element, and mechanism in said drum for rotating said first mentioned reflector in accordance with the rotation of said drum, and through half of the angle of rotation of said drum, said reflectors being arranged relatively to each other to reflect light from one of said refracting elements to the other.

9. An optical instrument according to claim 8 characterized in that the disks which form the drum are provided with outwardly extending portions engaging the ends of said cylindrical supporting member and in which adjustable clamping members are provided for connecting said disks and for urging said outwardly extending portions of said disks against said ends of said supporting member to vary the frictional resistance to turning of said drum.

10. A microscope having an arm adjustable toward and from the object to be observed, an objective mounted on said arm, said arm having a hollow partly cylindrical bearing member arranged above said objective with the axial ray from said objective extending substantially radially with reference to said cylindrical bearing member, said hollow partly cylindrical part having the inner surface thereof finished to form a cylindrical bearing, a hollow drum having its peripheral portion bearing in said cylindrical bearing of said partly cylindrical part to rotate on an axis intersecting the axial ray from the objective, an eyepiece tube mounted on said drum in substantially tangential relation thereto, said hollow cylindrical member having a segmental opening therein through which a part of said eyepiece tube extends and in which said part of said eyepiece tube moves when said drum is rotated, said opening being of sufficient size to permit said eyepiece tube and said drum to rotate through approximately 90 degrees, a reflector arranged within said hollow drum to receive light from said objective, a frame to which said reflector is secured and which has pintles journalled in holes formed in the axial portions of said drum, said frame supporting said reflector with the axis of rotation of said drum lying in the plane of the reflecting surface of said reflector, a second reflector mounted in fixed relation to said drum at the inner end of said eyepiece tube and at an acute angle to the optical axis of said eyepiece and in such angular relation to said optical axis of said eyepiece to receive light from said first reflector and to reflect said light to said eyepiece, and a part in said drum cooperating with said frame and with said hollow cylindrical part for moving said first mentioned reflector through one half of the angle of movement of said drum, said first reflector being arranged in position to reflect light from said objective to said second reflector during all positions of said eyepiece tube.

11. An optical instrument having two refracting elements constituting an eyepiece and an objective, a hollow partly cylindrical bearing member having its inner surface finished to form a bearing and having one of said elements fixed thereto and extending substantially radially with reference to said partly cylindrical member, a hollow drum having a portion thereof arranged within said partly cylindrical member and having the peripheral portion thereof bearing in said finished inner surface thereof to revolve therein to form a hollow axle, the other of said elements being mounted on said drum axle in substantially tangential fixed relation thereto, said cylindrical bearing member having a segmental opening in which a part of said other element moves when said drum axle is rotated within said bearing member, said drum axle having a segmental opening through which light may pass from the first of said refracting elements into the interior of said drum axle, a reflector pivotally mounted in said hollow drum axle with its pivotal axis in the optical axis of said other refracting element, another reflector mounted in fixed relation to said other refracting element, means for controlling the swinging of said first mentioned reflector to reflect light from one of said refracting elements to the other through the medium of said other reflector, and a guard movable with said drum for preventing light and foreign material from passing through said segmental opening of said drum axle.

12. An optical instrument having two refracting elements constituting an objective and an eyepiece, a mounting for said refracting elements on which one of said elements is mounted in fixed position, a bearing in said mounting about which the other refracting element may swing through an angle of approximately 90 degrees from a position in which the optical axes of said refracting elements are parallel to each other to a position in which the same optical axes are substantially perpendicular to each other, two reflecting members each having only one reflecting surface interposed between said refracting elements to reflect light from one to the other, one of said reflecting members being mounted in fixed relation to said other refracting element with its reflecting surface intersecting the optical axis of said other refracting element at an angle of less than 45 degrees, a mounting for the other reflecting member including a pivot having its axis extending at a right angle to the optical axis of the first mentioned element and lying substantially in the plane of the reflecting surface of said other reflecting member, mechanism for revolving said other reflecting member through half the angular displacement of said refracting elements relatively to each other, the reflecting surface of said other reflecting member being positioned at an angle of less than 45 degrees to the optical axis of said first mentioned refracting element when the axes of said refracting elements are parallel, and at an angle greater than 45 degrees when said other refracting element is swung into its position perpendicular to said optical axis of said first mentioned refracting element.

13. A microscope having an objective and an eyepiece, a mounting on which said objective is secured in fixed position, a bearing in said mounting about which the eyepiece may swing through an angle of approximately 90 degrees from a position in which the optical axes of the objective and eyepiece are substantially parallel to each other to a position in which said optical axes are substantially perpendicular to each other, two reflecting members interposed between said objective and eyepiece to reflect light from the objective to the eyepiece, one of said reflecting members being mounted in fixed relation to the eyepiece with its reflecting surface intersecting the optical axis of the eyepiece at an angle of less than 45 degrees, a mounting for the other reflecting member including a pivot having its axis extending at a right angle to the path of the axial ray of the light from the objective and lying substantially in the plane of the reflecting surface of said other reflecting member, mechanism for revolving the other reflecting member through half the angular displacement of said eyepiece, the reflecting surface of said other reflecting member being positioned at an angle of less than 45 degrees to the optical axis of the objective when the axes of objective and eyepiece are substantially parallel, and at an angle greater than 45 degrees when the eyepiece in swung into a position with its optical axis perpendicular to the optical axis of the objective.

14. A telescope having an objective and an eyepiece, a mounting on which the eyepiece is secured in fixed position, a bearing on said mounting about which the objective may swing through an angle of approximately 90 degrees from a position in which the optical axes of the objective and eyepiece are substantially parallel to each other to a position in which said optical axes are substantially perpendicular to each other, two reflecting members each having only one reflecting surface interposed between the objective and the eyepiece to reflect light from the objective to the eyepiece, one of said reflecting members being mounted in fixed relation to the objective with its reflecting surface intersecting the optical axis of the objective at an angle of less than 45 degrees, a mounting for the other reflecting member including a pivot having its axis extending at a right angle to the optical axis of the eyepiece and lying substantially in the plane of the reflecting surface of said other reflecting member, mechanism for revolving said other reflecting member through half the angular displacement of said objective, the reflecting surface of said other reflecting member being positioned at an angle of less than 45 degrees to the optical axis of said eyepiece when the axes of the objective and eyepiece are substantially parallel, and at an angle of more than 45 degrees when the objective is swung into a position with its optical axis perpendicular to the optical axis of the eyepiece.

15. A telescope having an objective and an eyepiece, a mounting on which the eyepiece is secured in fixed position, a bearing on said mounting about which the objective may swing through an angle of approximately 90 degrees from a position in which the optical axes of the objective and eyepiece are substantially parallel to each other to a position in which said optical axes are substantially perpendicular to each other, two reflecting members each having only one reflecting surface interposed between the objective and the eyepiece to reflect light from the objectives to the eyepiece, one of said reflecting members being mounted in fixed relation to the eyepiece with its reflecting surface intersecting the optical axis of the eyepiece at an angle of less than 45 degrees, a mounting for the other reflecting member including a pivot having its axis extending at a right angle to the optical axis of the objective and lying substantially in a plane of the reflecting surface of said other reflecting member, mechanism for revolving the other reflecting member through half the angular displacement of said objective, the reflecting surface of said other reflecting member being positioned at an angle of less than 45 degrees to the optical axis of the objective when the axes of the objective and eyepiece are substantially parallel and at an angle greater than 45 degrees when the objective is swung into a position with its optical axis perpendicular to the optical axis of the eyepiece.

16. An optical instrument having two refracting elements constituting an objectve and an eyepiece, a mounting for said refracting elements on which one of said elements is mounted in fixed position, a bearing on said mounting about which the other refracting element may swing through an angle of approximately 90 degrees from a position in which the optical axes of said refracting elements are parallel to each other to a position in which the same optical axes are substantially perpendicular to each other, two reflecting members each having only one reflecting surface interposed between said refracting elements to reflect light from one to the other, one of said reflecting members being mounted in fixed relation to said other refracting element with its reflecting surface intersecting the optical axis of said other refracting element at an angle of approximately 30 degrees, a mounting for the other reflecting member including a pivot having its axis extending at a right angle to the optical axis of the first mentioned element and lying substantially in the plane of the reflecting surface of said other reflecting member, mechanism for revolving said other reflecting member through half the angular displacement of said refracting elements relatively to each other, the reflecting surface of said other reflecting member being positioned at an angle of about 30 degrees to the optical axis of said first mentioned refracting element when the axes of said refracting elements are parallel, and at an angle of about 75 degrees when said other refracting element is swung into its position perpendicular to said optical axis of said first mentioned refracting element.

17. An optical instrument having two refracting elements constituting an objective and an eyepiece, a mounting for said refracting elements on which one of said elements is mounted in fixed position, a bearing on said mounting about which the other refracting element may swing through an angle of approximately 90 degrees, two reflecting members each having only one reflecting surface interposed between said refracting elements to reflect light from one to the other, one of said reflecting members being mounted in fixed angular relation to the inner end of said swingable element, pivots for supporting the other reflecting member, the axis of rotation of said pivots being arranged to intersect the optical axis of the stationary refracting element and perpendicular thereto, and mechanism actuated by the swinging of said swingable refracting element to move said reflecting member about its pivots through half the angle of the swing of said swingable element.

18. A microscope including a stage, an arm having the upper portion thereof extending over said stage and adjustable toward and from said stage, the upper portion of said arm being of substantially U-shape in cross section with a transverse web portion and two upwardly extending flanges integrally connected therewith, an objective mounted on said web portion, a bearing formed in the flanges of said arm with its axis intersecting the optical axis of said objective, a part rotatable in said bearing, an eyepiece tube rigidly mounted on said part, said eyepiece tube being swingable from a substantially upright position into a substantially horizontal position, said eyepiece tube when in substantially horizontal position being arranged between said flanges of said arm, and reflecting means mounted on said arm and said part for reflecting light from the objective to the eyepiece.

19. In an optical instrument having a pair of refracting elements, one of which constitutes an objective and the other of which constitutes an eyepiece, that improvement for mounting said refracting elements in operative relation to each other to permit them to swing relatively to each other, which includes an outer bearing member on which one of said refracting elements is mounted, an inner drum-like member constituting a hollow axle journalled within said outer bearing member and on which the other refracting element is secured in a substantially tangential relation thereto, and reflecting devices within said hollow axle member for reflecting light from one refracting element to the other, said outer bearing member and said hollow axle constituting the sole connection between said refracting elements.

20. An optical instrument according to claim 19, in which said hollow axle has outwardly extending flanges on the ends thereof adjustable toward and from each other and frictionally engaging the ends of said outer bearing member for frictionally holding said refracting members in various angular relations to each other.

HARVEY N. OTT.

REFERENCES CITED

The following references are of record in the file of this patent:

UNITED STATES PATENTS

| Number | Name | Date |
|---|---|---|
| 1,310,776 | Akeley | July 22, 1919 |
| 1,520,245 | Humbrecht | Dec. 23, 1924 |
| 1,539,579 | Kucharski | May 26, 1925 |
| 2,132,122 | Ott | Oct. 4, 1938 |
| 2,138,665 | Ott | Nov. 29, 1938 |
| 2,184,615 | Gunther | Dec. 26, 1939 |

FOREIGN PATENTS

| Number | Country | Date |
|---|---|---|
| 19,112 | Great Britain | Aug. 15, 1910 |
| 83,234 | Austria | Mar. 25, 1921 |
| 473,539 | Great Britain | Oct. 15, 1937 |